March 24, 1959 B. KAZAN 2,879,505

LIGHT CONTROLLED ELECTRICAL CIRCUIT

Filed Oct. 31, 1956 3 Sheets-Sheet 1

INVENTOR.
Benjamin Kazan
BY J. L. Whittaker
ATTORNEY

INVENTOR.
Benjamin Kazan
BY J. L. Whittaker
ATTORNEY

March 24, 1959 B. KAZAN 2,879,505
LIGHT CONTROLLED ELECTRICAL CIRCUIT
Filed Oct. 31, 1956 3 Sheets-Sheet 3

INVENTOR.
Benjamin Kazan
BY J. L. Whittaker
ATTORNEY

United States Patent Office 2,879,505

Patented Mar. 24, 1959

2,879,505

LIGHT CONTROLLED ELECTRICAL CIRCUIT

Benjamin Kazan, Princeton, N.J., assignor to Radio Corporation of America, a corporation of Delaware Application October 31, 1956, Serial No. 619,507

11 Claims. (Cl. 343—100)

The present invention relates generally to a new and improved amplitude modulator and particularly to an improved sweep generator for a radial time base display.

There has long been a need in the radar art for a cheap, simple, light-weight system for radially deflecting the electron beam of an indicator having fixed beam deflection means synchronously with the scanning radar antenna. Present methods for producing such displays require the use of sine-cosine potentiometers or condensers, or synchros. A disadvantage of the potentiometer is brush noise. Another is the variation in brush resistance. Another is that the resistance of each brush to ground is fairly high which means that leads from the potentiometer must be shielded and limited in length if high sweep speeds are required. The limitations of the sine-cosine condenser are explained in some detail in section 13.9 of volume 22 of the Radiation Laboratory Series. These have caused this arrangement seldom to be used. Synchro types of electrostatic drive systems are relatively expensive and require fairly involved circuits.

The invention, in its broader aspect, includes an oscillator, a load, and a light responsive impedance element in circuit with said oscillator and said load. The light responsive element may be connected, for example, in series between the oscillator and the load or, in another form of the invention, in shunt with the load. When illuminated by light, the impedance of the light responsive element changes as a function of the light excitation. Thus, when modulated light is applied to the light responsive element, a modulated oscillatory signal appears across the load.

A particular form of the invention comprises a deflection circuit for a cathode ray tube indicator. It includes a plurality of light responsive impedance elements connected between a source of substantially constant amplitude sawtooth current and the horizontal and vertical deflection means of the cathode ray tube. The elements are selectively illuminated by a source of light in such manner that their impedances change sinusoidally. They are positioned in the circuit to prevent current flow in the absence of light excitation and to cause sine and cosine modulated sawtooth voltages to be applied to the respective horizontal and vertical deflection means, when illuminated in the manner described. The means for selectively illuminating the light responsive elements includes a mask formed with sinusoidally shaped apertures through which the light reaching the elements passes, driven in synchronism with the radar antenna.

The circuit has important advantages. One is the absence of sliding contacts and their mechanical and electrical drawbacks. Others are the circuit simplicity, its small size, its light weight and its low cost.

The invention will be described in greater detail by reference to the following description taken in connection with the accompanying drawing in which:

Figure 1 is a block and schematic circuit diagram of a preferred form of the invention;

Figures 2*a* and 2*b* are curves showing how the impedances of the light responsive elements in the circuit of Figure 1 vary;

Figure 3 is a view of a portion of the arrangement of Figure 1;

Figures 4*a* and 4*b* are sketches of the sawtooth waves applied to the horizontal and vertical deflection plates;

Figure 7A:
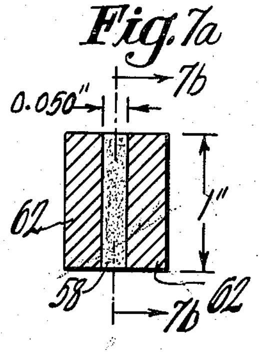
Figure 7B:
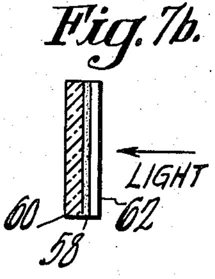
Figure 8:
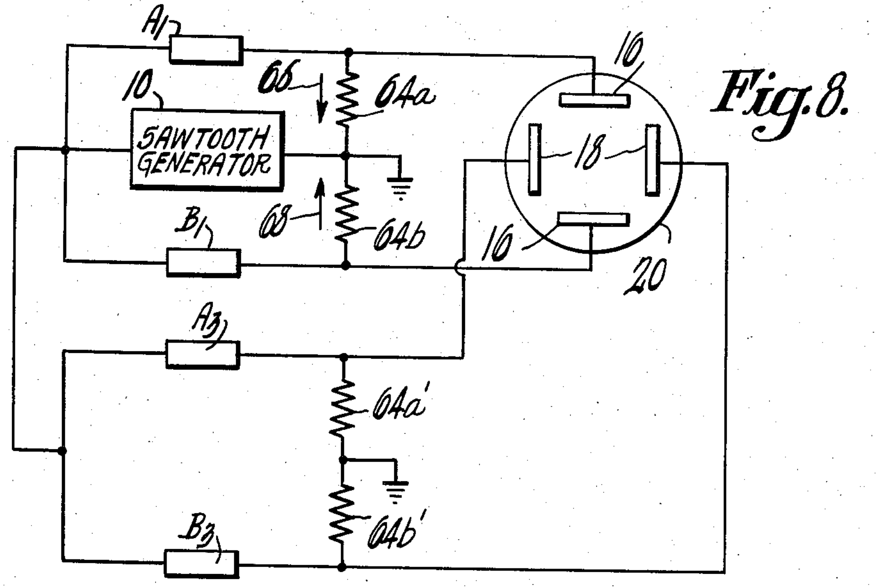
Figure 9:
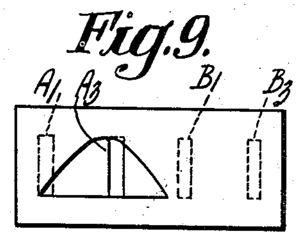

Figures 7*a* and 7*b* are plan and cross-sectional views, respectively, of another type of photoconductive element which may be used in this invention;

Figure 8 is a block and schematic circuit diagram of a simplified form of the present invention; and Figure 9 is a view of a portion of the arrangement of Figure 8.

Throughout the figures similar reference characters are applied to similar elements.

Figure 1:
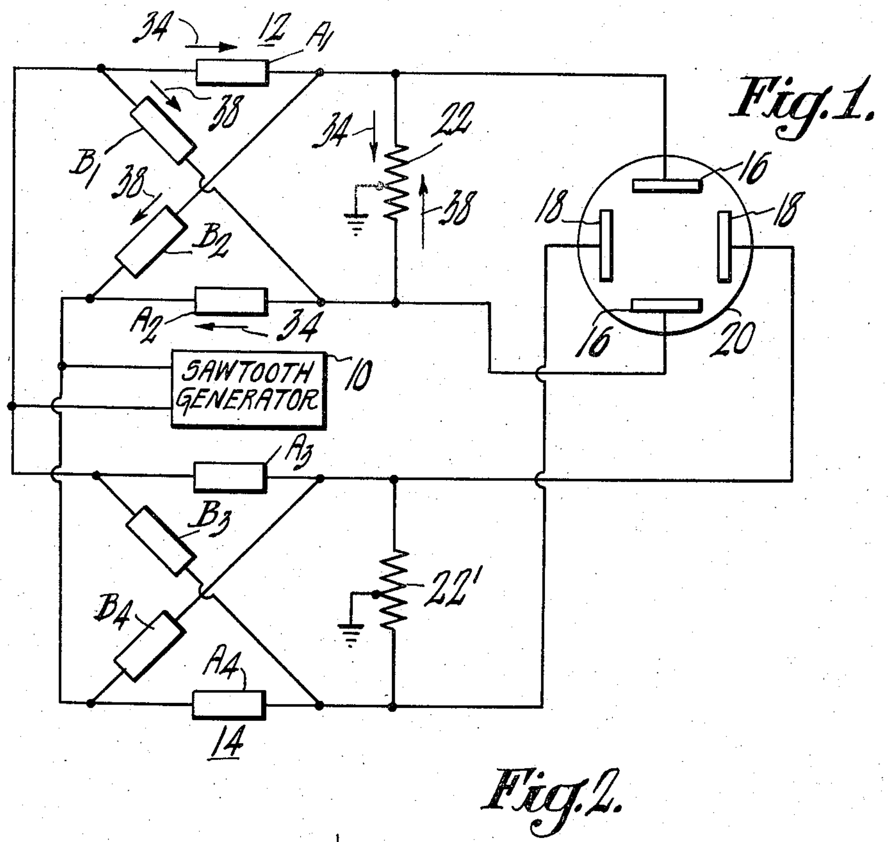

Referring to Figure 1, sawtooth generator 10 applies its output voltage through circuits 12 and 14 to the vertical deflection plates 16 and horizontal deflection plates 18, respectively, of a cathode ray tube indicator 20. Circuit 12 consists of four photoconductive elements $A_1$, $A_2$ and $B_1$, $B_2$ and a load resistor 22. Circuit 14 is similar to circuit 12. It includes photoconductive elements $A_3$, $A_4$ and $B_3$, $B_4$ and also has a load resistor 22'.

The photoconductive elements are relatively long and narrow. They may consist of a layer of photoconductive material with electrodes on opposite surfaces, one of which is transparent. Or they may consist of a thin layer of photoconductive material between an elongated electrode gap.

Figure 6:
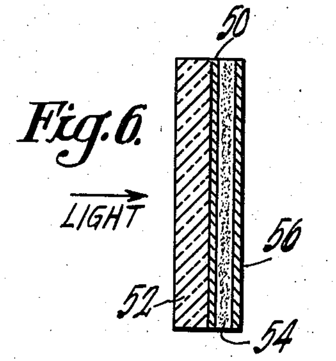
Figure 6 is a cross-sectional view through one type of photoconductive element which may be used in the circuit of the invention.

The first type of element is shown in Figure 6. It consists of a transparent conductive layer 50, formed of stannous chloride or the like, on a transparent backing such as glass plate 52. Adjacent to the conductive layer is a layer of light responsive (photoconductive) material 54, such as CdSe powder bonded in ethyl cellulose plastic. The final layer 56 is an opaque metal such as silver which may be sprayed onto the CdSe layer.

The second type of element is shown in Figures 7*a* and 7*b*. It includes a layer of light sensitive material 58, such as sintered CdSe, on a backing layer, such as glass plate 60. Two opaque electrodes 62 are evaporated or sprayed onto the layer 58. The electrodes may be about one inch in length at the gap between the electrodes, and the gap spacing may be about 0.050 inch.

The photoconductive elements have an impedance which is sufficiently high, in the absence of light excitation, to prevent current flow through the elements. However, when they are illuminated, their impedance decreases in accordance with the intensity of illumination on a given area or with the area illuminated for a given light intensity. According to this invention, the impedances of elements $A_1$ and $A_2$ are varied in synchronism. The impedances of elements $B_1$ and $B_2$ are also varied in synchronism. This is done by first illuminating elements $A_1$ and $A_2$, while maintaining $B_1$ and $B_2$ masked, and then illuminating elements $B_1$ and $B_2$, while maintaining elements $A_1$ and $A_2$ masked. The light flux reaching the photoconductive elements is made to vary in a sinusoidal manner, whereby the impedances of the elements also vary sinusoidally. Variation of light flux rather than light intensity is advantageous in that the variation of photoconductive element impedance is a linear function of the light flux, but not of light intensity. In like manner, the impedances of the photoconductive elements in circuit 14 are made to vary cosinusoidally synchronously with the sinusoidal variation of the impedances of the corresponding elements in circuit 12.

Figure 2:
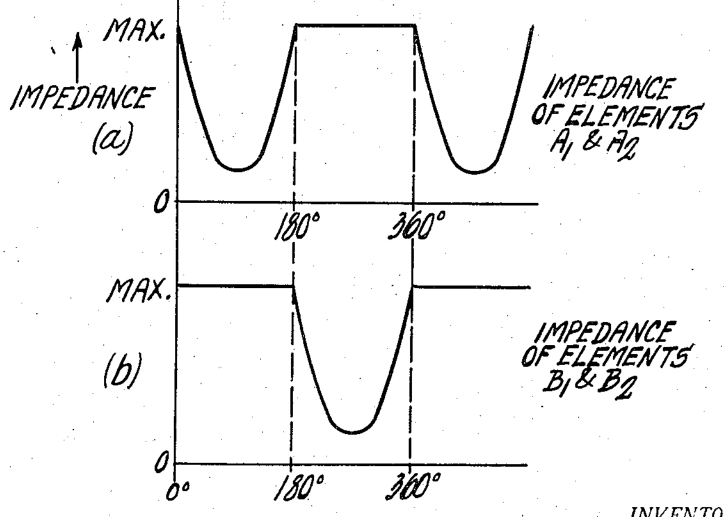
Figure 3:
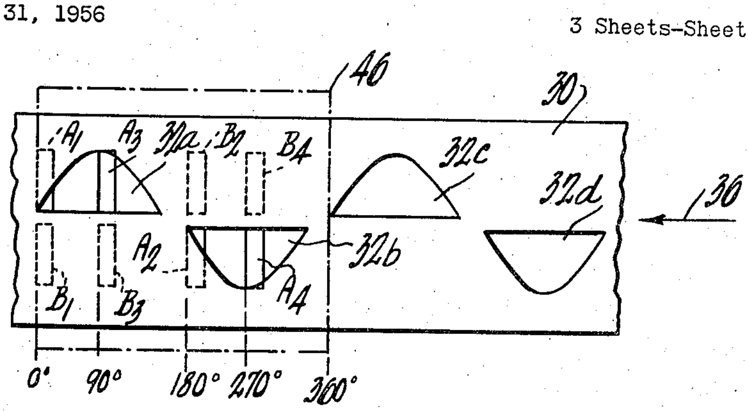

One way of illuminating the elements in the desired manner is shown in Figure 3. The elements $A_1$, $A_3$ and $B_2$, $B_4$ are spaced equal distances from one another, and the elements $B_1$, $B_3$, $A_2$ and $A_4$ are positioned beneath elements $A_1$, $A_3$, $B_2$ and $B_4$, respectively. A mask 30 formed with sinusoidally shaped slots 32*a*—32*d* passes over the elements. A source of light, not shown in Figure 3, illuminates the mask and light passes through the apertures. As can be seen, elements $A_1$ and $A_2$ are simultaneously illuminated. The light striking elements $A_1$ and $A_2$ causes their impedance to become lowered, as shown in Figure 2*a*, and a sawtooth current wave to flow through elements $A_1$ and $A_2$ and resistor 22 in one direction—for example, the direction indicated by arrows 34 of Figure 1. As the mask moves in the direction indicated by arrow 36 (Figure 3), the current through elements $A_1$ and $A_2$ increases in a sinusoidal manner to a maximum value and then decreases in a sinusoidal manner to zero. After slots 32*a* and 32*b* pass over elements $A_1$ and $A_2$, respectively, and these elements are masked, slots 32*c* and 32*d* pass over elements $B_1$ and $B_2$, respectively. The impedance of the latter elements now slowly decreases to a minimum value and then increases to a maximum value in a sinusoidal manner, as shown in Figure 2*b*. Current now flows through elements $B_1$ and $B_2$, and resistor 22 (Figure 1) in the direction of arrows 38 (Figure 1).

Photoconductive elements $A_3$, $A_4$ and $B_3$, $B_4$ are so placed relative to the photoconductive elements of circuit 12 that the sawtooth wave applied to the horizontal deflection plates is modulated by a sine wave 90° out of phase with the sine wave modulating the sawtooth wave applied to the vertical deflection plates 16. These waves are shown in Figures 4*a* and 4*b*.

Figure 5:
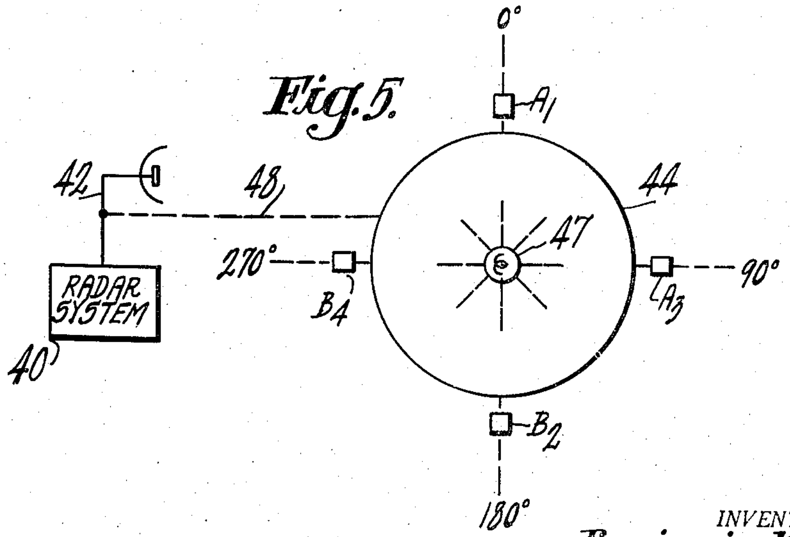
Figure 5 is a diagram showing a radar system and how the circuit of Figure 1 may be incorporated in it.

A radar system in which the present invention may be employed is shown in Figure 5. The system as shown is a single block 40 and includes a scanning antenna 42. The drive means of the antenna consists of a motor or the like. The photoconductive elements $A_1$, $A_3$, $B_2$ and $B_4$ are shown in end view. The remaining photoconductive elements are aligned with the ones shown and behind the ones shown. Mask 44 may consist of the portion of the mask shown in Figure 3 which is within the dot-dash block 46. This portion of the mask is bent back upon itself to form a cylinder such as shown in end view in Figure 5. Within the cylinder is a line source of light 47 also shown in end view. The mask 44 is driven in synchronism with the antenna as indicated by the dashed connection 48. The latter may be a mechanical or an electrical connection.

The line source of light for the arrangement of Figure 5 may consist of a thin, heated tungsten wire. The photoconductive elements each may comprise a cell such as shown in Figure 6 or in Figures 7*a* and 7*b*. A photoconductive element such as shown in Figures 7*a* and 7*b* has a resistance in the dark of about $10^4$ megohms or more. When illuminated with 5 foot candles of light along its entire length, it has a resistance of about 1 megohm. With a load resistance 22 or 22′ (Figure 1) across the deflection plates of about 1 megohm, such photoconductors provide good control. The response time of the photoconductors is of the order of 10 milliseconds at the light levels indicated.

Figure 4:
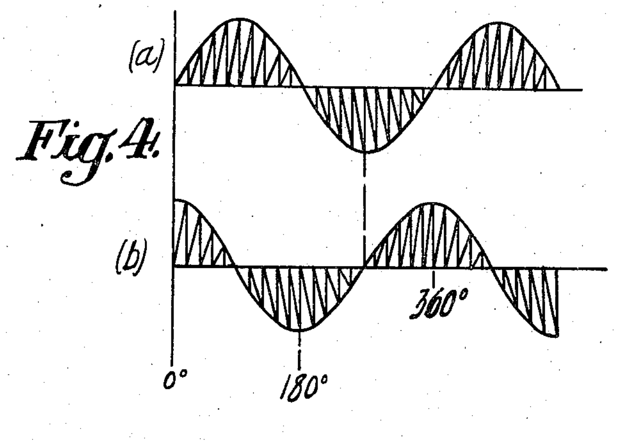

The circuit shown in Figure 1 is double-ended and has the advantages of push-pull type of operation. A more simplified circuit is shown in Figure 8. This circuit requires only one-half the number of photoconductive elements as the circuit shown in Figure 5. The operation of this circuit is straight-forward and will be described briefly. Element $B_1$ is masked while element $A_1$ is illuminated, and element $B_3$ is masked while element $A_3$ is illuminated. As in the case of the embodiment of Figure 3, the amount of light reaching the various elements varies in a sinusoidal manner. The impedance variation of element $A_1$ is 90° out of phase with the impedance variation across element $A_3$ and the impedance variation of element $B_1$ is 90° out of phase with the impedance variation of element $B_3$. The voltage across load resistors 64*a*, 64*b* and 64*a′*, 64*b′* is in the same form as is shown in Figure 4. Taking the upper circuit, for example, current first flows in the direction of arrow 66 to ground and then in the direction of arrow 68 to ground. The waveform across the load resistors is such that radial deflection of the cathode ray tube beam results.

A type of mask which may be used to illuminate the photoconductive elements and the position of the photoconductive elements relative of the mask are shown in Figure 9. As in the embodiment of Figure 1, the mask may be folded back upon itself to form a cylinder. A light source may be positioned at the center of the cylinder and the photoconductive elements spaced at 90° interval around the outside of the cylinder.

In the description above, the applicability of the invention to electrostatic type cathode ray tubes has been stressed. It should be mentioned that the invention is also applicable to electromagnetic deflection cathode ray tubes, using two sets of stationary coils at right angles to each other. With tubes of this type, the sawtooth voltage generated by source 10 (Figures 1 and 8) is a sawtooth wave on a square wave pedestal, and the photoconductive elements modulate the amplitude and polarity of the sawtooth current flowing through the coils.

What is claimed is:

1. In combination, an oscillator; a load; a light responsive impedance element connected in series between the load and the oscillator, said impedance element having an impedance which is sufficiently high, in the absence of light excitation, substantially to prevent conduction of current through the element to the load, and which varies as a function of the light illumination it receives; means for applying modulated light to said light responsive element so as to modulate the oscillatory signal appearing across said load; and connections for deriving an amplitude modulated output signal from said load.

2. In combination, an oscillator; a load; an impedance network having an impedance which is sufficiently high, in the absence of light excitation, substantially to prevent conduction therethrough, interconnecting said oscillator to said load, said network including a light responsive element connected to conduct the oscillator output signal to said load, when excited by light, said element having an impedance which is relatively high in the absence of light and which varies as a function of the amount of light illuminating said element; means for applying modulated light to said light responsive element; and connections for deriving an output signal from said load.

3. In combination, an oscillator; a load coupled to the oscillator; a light responsive impedance element in circuit with the oscillator for changing the amplitude of the oscillatory signal across the load when the impedance of the light responsive element changes, said impedance element having an impedance which is high in the absence of light excitation and which varies as a function of the light illumination it receives; means for applying modulated light to said light responsive element so as to modulate the oscillatory signal appearing across said load; and connections for deriving an amplitude-modulated output signal from said load.

4. In combination, a sawtooth wave generator for generating a substantially constant amplitude sawtooth current wave, said generator having a pair of output terminals; a load having a pair of input terminals; a light responsive impedance element connected in series between one of said output terminals and one of said input terminals; a second light responsive impedance element connected in series between said one output terminal and the other of said input terminals, said light responsive impedance elements having an impedance which is sufficiently high, in the absence of light excitation, substantially to prevent conduction through said elements, and which varies inversely as the amount of light illuminating the elements; and means for alternately applying sinusoidally modulated light to said light responsive elements.

5. In combination, a sawtooth wave generator for generating a substantially constant amplitude sawtooth current wave, said generator having a pair of output terminals; a first load resistor having a pair of terminals at opposite ends thereof; a second load resistor having a pair of terminals at opposite ends thereof; a first network including a first light responsive impedance element connected in series between one of said output terminals and a terminal of said first load resistor and a second light responsive impedance element connected in series between said one output terminal and the other terminal of said first load resistor; a second network including third light responsive impedance element connected in series between the other output terminal and one terminal of the second load resistor and a fourth light responsive impedance element connected in series between said other output terminal and the other terminal of said second load resistor, said light responsive impedance elements having an impedance which is sufficiently high in the absence of light excitation substantially to prevent conduction through said elements, and which varies inversely as the amount of light illuminating the elements; and means for simultaneously applying sinusoidally modulated light to the first light responsive means and cosinusoidally modulated light to the third light responsive means, and then simultaneously applying sinusoidally modulated light to the second light responsive means and cosinusoidally modulated light to the fourth light responsive means.

6. A radial deflection circuit for a cathode ray tube indicator comprising, in combination, a sawtooth wave generator for generating a substantially constant amplitude sawtooth current wave; a first load impedance; a second load impedance; a first impedance network interconnecting said generator with said first load impedance; a second impedance network interconnecting said generator with said second load impedance, each said impedance network having an impedance which is sufficiently high in the absence of light excitation substantially to prevent conduction therethrough, and each including first and second light responsive means, one for conducting current through its load in one direction, when excited by light, and the other for conducting current through its load in the opposite direction, when excited by light, each light responsive means having an impedance which varies inversely as the amount of light striking the element; and means for simultaneously applying sinusoidally modulated light to one light responsive means in said first impedance network and cosinusoidally modulated light to one light responsive means in the other impedance network, and then simultaneously applying sinusoidally modulated light to the second light responsive means in the first impedance network and cosinusoidally modulated light to the second light responsive means in the second impedance network.

7. In combination, a sawtooth wave generator for generating a substantially constant amplitude sawtooth current wave, said generator having a pair of output terminals; a load resistor having a pair of terminals at opposite ends thereof; a second load resistor having a pair of terminals at opposite ends thereof; a first network including a first light responsive impedance element connected in series between one of said output terminals and a terminal of one load resistor and a second light responsive impedance element connected in series between said one output terminal and the other terminal of said first load resistor; a second network including a third light responsive impedance element connected in series between the other output terminal and one terminal of the second load resistor and a fourth light responsive impedance element connected in series between said other output terminal and the other terminal of said second load resistor, said light responsive impedance elements having an impedance which is sufficiently high in the absence of light excitation substantially to prevent conduction through said elements, and which varies inversely as the amount of light illuminating the elements; and means for simultaneously applying sinusoidally modulated light to the first light responsive means and cosinusoidally modulated light to the third light responsive means, and then simultaneously applying sinusoidally modulated light to the second light responsive means and cosinusoidally modulated light to the fourth light responsive means; and a cathode ray tube indicator having fixed horizontal and vertical beam deflection means, said vertical deflection means being connected to the terminals of said first load resistor and said horizontal beam deflection means being connected to the terminals of said second load resistor.

8. In a radar system including a scanning antenna and a cathode ray tube indicator having horizontal and vertical electrostatic beam deflection plates, in combination, a sawtooth wave generator for generating a substantially constant amplitude sawtooth current wave; a first load impedance; a second load impedance; a first impedance network interconnecting said generator with said first load impedance; a second impedance network interconnecting said generator with said second load impedance, each said impedance network having an impedance which is sufficiently high in the absence of light excitation substantially to prevent conduction therethrough, and each including first and second light responsive means, one for conducting current through its load in one direction, when excited by light, and the other for conducting current through its load in the opposite direction, when excited by light, each light responsive means having an impedance which varies inversely as the amount of light striking the element; and means operative synchronously with the movement of said scanning antenna for simultaneously applying sinusoidally modulated light to one light responsive means in said first impedance network and cosinusoidally modulated light to one light responsive means in the other impedance network, and then simultaneously applying sinusoidally modulated light to the second light responsive means in the first impedance network and cosinusoidally modulated light to the second light responsive means in the second impedance network.

9. In combination, a sawtooth wave generator for generating a substantially constant amplitude sawtooth current wave; a load; an impedance network having an impedance which is sufficiently high, in the absence of light excitation, substantially to prevent conduction therethrough, interconnecting said generator to said load, said network including a first light responsive element connected to conduct the sawtooth current in one direction through said load, when excited by light, and a second light responsive element connected to conduct the sawtooth current in the opposite direction through said load, when excited by light, said elements having an impedance which is relatively high in the absence of light and which varies inversely as a function of the amount of light illuminating the elements; and means for alternately applying sinusoidally modulated light to said light responsive elements.

10. In combination, a sawtooth wave generator for generating a substantially constant amplitude sawtooth current wave; a load; an impedance network having an impedance which is sufficiently high, in the absence of light excitation, substantially to prevent conduction therethrough, interconnecting said generator to said load, said network including a first light responsive element connected to conduct the sawtooth current in one direction through said load, when excited by light, and a second light responsive element connected to conduct the sawtooth current in the opposite direction through said load, when excited by light, said elements having an impedance which is relatively high in the absence of light and which varies inversely as the amount of light illuminating the elements; and means for applying sinusoidally modulated light to one element while masking the other and then applying sinusoidally modulated light to the other element while masking the first.

11. In the combination as set forth in claim 10, the last-named means including a mask formed with sinusoidally shaped apertures therein, a source of light illuminating the mask, the light responsive elements being positioned on the side of the mask opposite the source of light, and means for driving the mask relative to the source of light and impedance elements.

References Cited in the file of this patent

UNITED STATES PATENTS

| | | |
|---|---|---|
| 2,043,800 | Karolus | June 9, 1936 |
| 2,411,030 | De Ryder | Nov. 12, 1946 |